United States Patent
Gotoh

[11] Patent Number: 5,266,857
[45] Date of Patent: Nov. 30, 1993

[54] OUTPUT-TERMINAL DEVICE FOR AN A.C. GENERATOR FOR A VEHICLE

[75] Inventor: Hitoshi Gotoh, Himeji

[73] Assignee: Mitsubishi Denki K.K., Tokyo, Japan

[21] Appl. No.: 899,382

[22] Filed: Jun. 16, 1992

[30] Foreign Application Priority Data

Jul. 5, 1991 [JP] Japan .................. 3-192592

[51] Int. Cl.$^5$ .................................... H02K 11/00
[52] U.S. Cl. ................................. 310/71; 310/68 D
[58] Field of Search ............... 310/71, 68 D, 89; 322/49

[56] References Cited

U.S. PATENT DOCUMENTS 4,843,267  6/1989  Kaneyuki ............... 310/68 D

FOREIGN PATENT DOCUMENTS 9103836  3/1991  Fed. Rep. of Germany .
2603431  3/1988  France .
2618272  1/1989  France .
3-4146   2/1991  Japan .

Primary Examiner—R. Skudy
Assistant Examiner—E. To
Attorney, Agent, or Firm—Sughrue, Mion, Zinn Macpeak & Seas

[57] ABSTRACT

An output-terminal device for an a.c. generator for a vehicle has a connecting seat which is provided at a connecting portion formed in an output side heat sink in a rectifier device attached to the rear bracket of the generator. When an output-terminal bolt extends in the lateral direction, an output-terminal bolt, which has a flat portion at the rear end portion, a polygonal flange portion at an intermediate portion and a threaded portion for connecting a terminal of an external wire at the front end portion, is attached to the connecting seat at its flat portion so as to extend in the lateral direction of the rear bracket. When an output-terminal bolt extends in the rear direction, the output-terminal bolt, which has first and second threaded portions at its rear and front end portions, is fixed to the connecting seat by inserting the rear end portion of the bolt in an opening formed in the connecting seat.

6 Claims, 5 Drawing Sheets

OUTPUT-TERMINAL DEVICE FOR AN A.C. GENERATOR FOR A VEHICLE

BACKGROUND OF THE INVENTION

Field of the Invention

The present invention relates to an output-terminal device for an a.c. generator for a vehicle wherein an output-terminal bolt is extended from the rear bracket of the generator. More particularly, the present invention relates to such an output-terminal device for an a.c. generator wherein the output-terminal bolt is extended in the rear direction or the lateral direction by simple modification.

FIG. 4A is a side view of a conventional output-terminal device for an a.c. generator for a vehicle, which is viewed from the rear side of the generator and wherein an output-terminal bolt is extended in the lateral direction of the generator. The a.c. generator is of a rotary magnetic pole type wherein a stator (not shown) is attached with a front bracket 1 and a rear bracket 2. In FIG. 4A, reference numeral 20 designates an output-terminal device provided at an outer end of the rear bracket 2 and the output-terminal bolt 21 projects in the lateral direction.

FIG. 4B is a cross-sectional view of the output-terminal device, connected to a rectifier device, taken along a line B4—B4 in FIG. 4A. In FIG. 4B, reference numerals 12 and 13 designate an output side (positive pole) heat sink and the other side (negative pole) heat sink of the rectifier device. In FIG. 4B, only connecting portions of the heat sinks are shown. Numeral 16 designates a connecting bolt of the output side which is passed through a wiring board 15 and is forcibly fitted to the connecting portion of the heat sink 12 to make an electric connection. The connecting bolt 16 is passed through an insulation tube 14 and is projected in the axial direction to the rear end of the rear bracket 2. The output-terminal device 20 comprises insulation terminal socket 22 made of a resinous material and the before-mentioned output-terminal bolt 21 connected to the connecting bolt 16 by means of a nut 17 which is embedded in the socket 22. The rear end of the terminal bolt 21 is formed to have a flat portion 21a. The terminal bolt 21 has a flange portion 21c at an intermediate portion and a threaded portion 21b at its front end which is used for connecting a terminal to the terminal bolt 21. The terminal socket 22 has a cylindrical flange portion 22a which projects from its one end and a cut portion 22b is formed in flange portion 22a for receiving a portion terminal. Numeral 24 designates an insulating cap which is fitted to the insulation terminal socket 22 to surround the nut 17. As indicated by chain lines, a crimp-style terminal 36 is connected to an external wire 35 by crimping. The crimp-style terminal 36 is fitted to the terminal bolt 21 and is fastened to it by means of a nut 37. The terminal 36 is inserted in the cut portion 22b so as to the terminal 36 from pivoting about the terminal bolt 21.

A three phase a.c. voltage generated in the a.c. generator is rectified into a d.c. voltage by means of the rectifier device and the d.c. voltage is outputted.

FIG. 5A is a side view in partial section of another conventional output-terminal device for an a.c. generator for a vehicle which is viewed from the rear side of the generator, and wherein the output-terminal bolt is extended to the rear direction of the generator. In FIG. 5A, reference numeral 25 designates an output-terminal device provided at an outer end of the rear bracket 2 so that the output-terminal bolt 26 is extended to the rear direction.

FIG. 5B is a cross-sectional view taken along a line B5—B5 in FIG. 5A in which the output-terminal device 25 connected to a rectifier device is shown. The connecting portion at each end of the heat sinks 12, 13 of the rectifier device and the wiring board 15 are attached to the rear bracket 2 by inserting an output-terminal bolt 26, which is used as a connecting bolt. The connecting portion of the heat sink 12 of output side is forcibly inserted into the terminal bolt 26 so as to be electrically connected thereto. The output-terminal device 20 has a construction as follows. An insulation terminal socket 28 is fastened to the output-terminal bolt 26 by means of a nut 27. The insulation terminal socket 28 made of a resinous material is provided with a circular opening at the bottom portion formed in one end of a cylindrical portion 28a of the insulation terminal socket 28. A cut portion 28b is formed at a part of the edge of the cylindrical portion 28a.

A crimp-style terminal 36, which is connected to an external wire 35, is connected to a threaded portion 26b of the output-terminal bolt 26 by means of a nut 37, and the crimp-style terminal 36 is inserted in the cut portion 28b so as to be prevented from turning, in the same manner as indicated by chain lines in FIG. 4B.

In the conventional output terminal devices for an a.c. generator for a vehicle, it is necessary to use different connecting bolts for the connecting portion of the heat sinks of the rectifier device in the cases that the output-terminal bolt is to be extended to the lateral direction or the rear direction. Accordingly, a number of structural elements are required and standardization is hindered.

SUMMARY OF THE INVENTION

It is an object of the present invention to provide an output-terminal device for an a.c. generator for a vehicle which reduces the number of structural elements to be used for either case where the output-terminal bolt is extended in the lateral direction or the case of where the bolt is extended in the rear direction, and to promotes standardization for the structural elements to thereby improve productivity.

In accordance with the present invention, there is provided an output-terminal device for an a.c. generator for a vehicle wherein a rectifier device for rectifying an a.c. voltage generated to output it as a d.c. voltage is attached to a rear bracket, and an output-terminal bolt connected to an end portion of an output-side heat sink of the rectifier device is extended to the lateral direction or the rear direction, characterized in that a connecting seat is provided at a connecting portion formed in the output side heat sink, wherein in a case that the output-terminal bolt is extended in the lateral direction, the output-terminal bolt, which has a flat portion at the rear end portion, a polygonal flange portion at an intermediate portion and a threaded portion for connecting a terminal of an external wire at the front end portion, is attached to the connecting seat at its flat portion so as to extend in the lateral direction of the rear bracket, and in a case that the output-terminal bolt is extended in the rear direction, the output-terminal bolt, which has first and second threaded portions at its rear and front end portions, is fixed to the connecting seat by inserting the rear end portion of the bolt in an opening formed in the connecting seat. The second threaded portion is used for connecting a terminal of an external wire.

In accordance with the present invention, it is only necessary that two kinds of output-terminal bolts are prepared in accordance with the direction to be extended. Only one kind of the rectifier device need be assembled regardless of the direction of the extension of the output-terminal bolt. Therefore, the standardization can be promoted.

DETAILED DESCRIPTION OF THE PREFERRED EMBODIMENTS

Several embodiments of the output-terminal device for a.c. generator for a vehicle according to the present invention will be described in more detail with reference to the drawings.

Figure 1A:
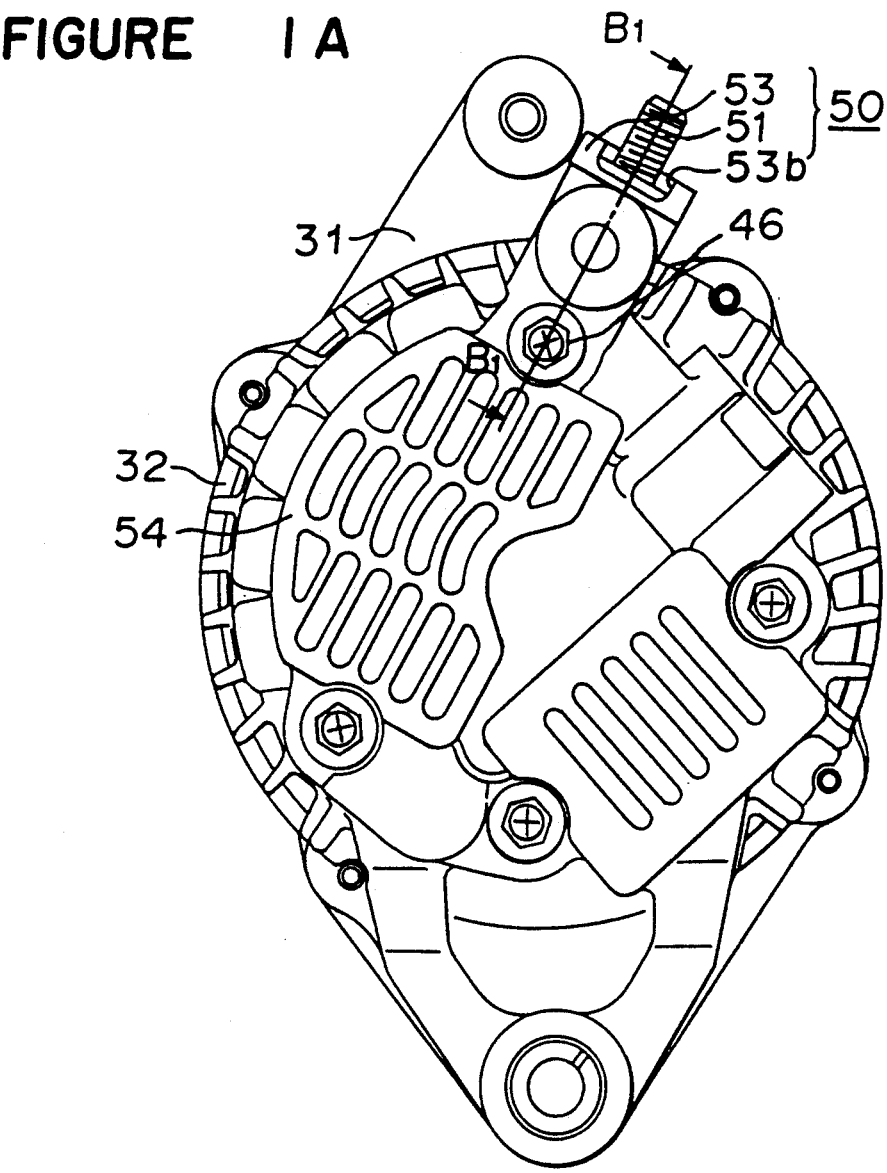
FIG. 1A is a side view of an embodiment of the output-terminal device for an a.c. generator for a vehicle according to the present invention, which is viewed from the rear side of the generator.

In FIG. 1A, a stator (not shown) for an a.c. generator is corrected to a front bracket 31 and a rear bracket 32 so that a rotor (not shown) is supported by the brackets by the aid of bearings (not shown). A rectifier device (not shown) is attached to the rear of bracket 32. An output-terminal device 50 is connected to a heat sink having a positive pole (output side) of the rectifier device. The output-terminal device 50 has an output-terminal bolt 51 which is extends in the lateral direction of the generator.

Figure 1B:
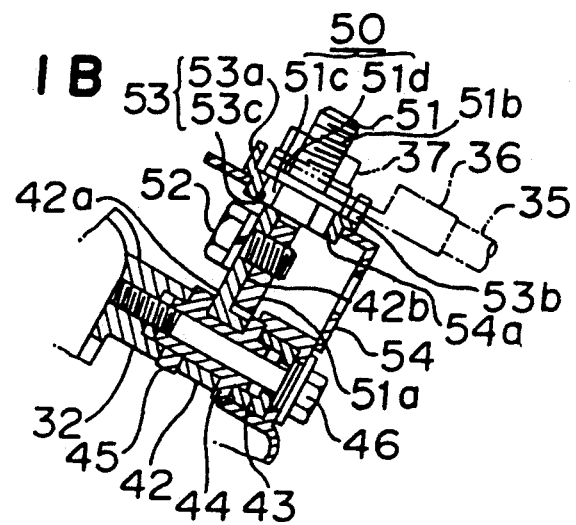
FIG. 1B is a cross-sectional view of the output-terminal device taken along a line B1—B1 in FIG. 1A.

The output-terminal device 50 connected to the output side of the rectifier device is shown in FIG. 1B in cross section. Numerals 42 and 43 designate heat sinks of an output side (having a positive pole) and the other side (having a negative pole) of the rectifier device. In FIG. 1B, only connecting portions of the heat sinks are shown. A connecting seat 42a is projected from the connecting portion of the output side heat sink 42. A concave portion 42b is formed in the connecting surface of the connecting seat 42a. Numeral 44 designates an insulation tube fitted to the connecting portions of the heat sinks 42, 43, and numeral 45 designates a wiring board in which wirings are embedded. In FIG. 1B, only the connecting portion of the wiring board 52 is shown and the insulation tube 44 is inserted in the hole formed in the wiring board. Numeral 46 designates a connecting bolt for connecting the connecting portions of the heat sinks 42, 43 and the connecting portion of the wiring board 45 to the rear bracket 32.

The output-terminal device 50 has a construction as follows. The output-terminal bolt 51 has a flat portion 51a at its rear end portion, a hexagonal flange portion 51c and a circular seat portion 51d at its intermediate portion, and a threaded portion 51b for connecting a terminal at its front end. Numeral 53 designates an insulation terminal socket made of a resinous material which has a bottomed cylindrical portion 53a. A hexagonal opening 53c which is fitted around the hexagonal flange portion 51c of the output-terminal bolt 51 is formed in the bottom portion. A cut portion 53b is formed at a part of the free end of the cylindrical portion 53a. The output-terminal bolt 51 to which the insulation terminal socket 53 is fitted, has the flat portion 51a which is fitted to the concave portion 42b of the connecting seat 42a of the heat sink 42 to thereby prevent the turning of the output-terminal bolt 51. Further, the flat portion 51a of the output-terminal bolt 51 is fastened to the connecting seat 42a by means of a fitting bolt 52. The insulation terminal socket 53 is fitted to the circular opening 54a formed in the insulation cover 54 and supported by the same. The insulation cover 54 is attached to the rear bracket 32.

The hexagonal flange portion 51b of the output-terminal bolt 51 and the hexagonal opening 51c formed in the insulation terminal socket 53 engaged with the flange portion 51b may have another polygonal shape other than a hexagonal shape.

A crimp-style terminal 36, which is connected to an external wire 35, can be fastened to the threaded portion 51b of the output-terminal bolt 51 by means of a nut 37, and the crimp-style terminal 36 is inserted in the cut portion 53b to prevent the terminal from the turning as indicated by chain lines in FIG. 1B.

Figure 2A:
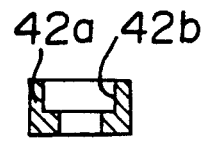
FIG. 2A is a side view of a rectifier device attached to the rear bracket of the generator, which is viewed from the front side of the rectifier device.

FIG. 2A shows a rectifier device, from the front side thereof, in which the connecting seat 42a is extended from the heat sink 42. A plurality of main diodes 41 are disposed in rear of the wiring board 45. The main diodes 41 are attached to the output side (positive pole) heat sink 42 and the other side (negative pole) heat sink 43. Numeral 47 designates a small sized diode.

Figure 2B:
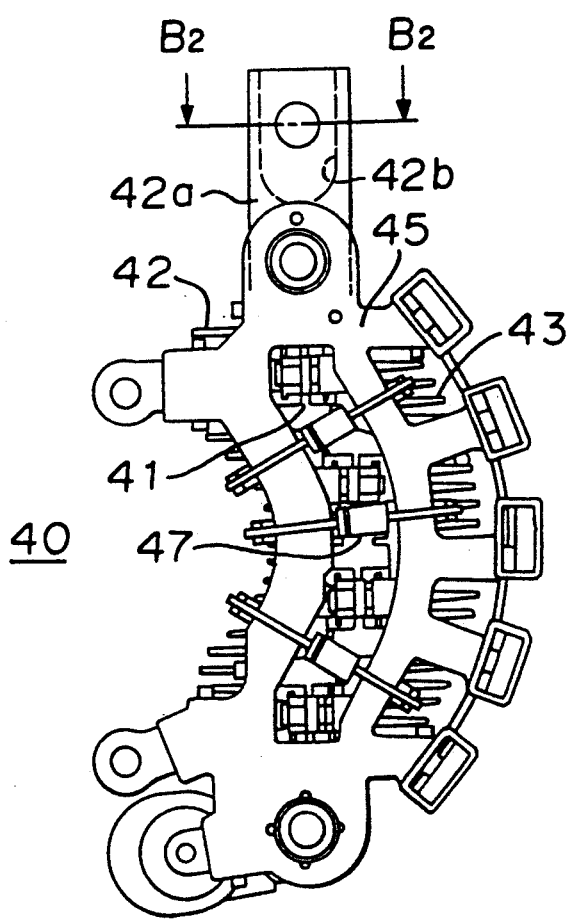
FIG. 2B is a cross-sectional view taken along a line B2—B2 in FIG. 2A.

FIG. 2B is a cross-sectional view taken along a line B2—B2 in FIG. 2A which shows the connecting seat 42a of the heat sink 42. The concave portion 42b is formed to allow the fitting of the flat portion 51a of the output-terminal bolt 51.

Figure 3A:
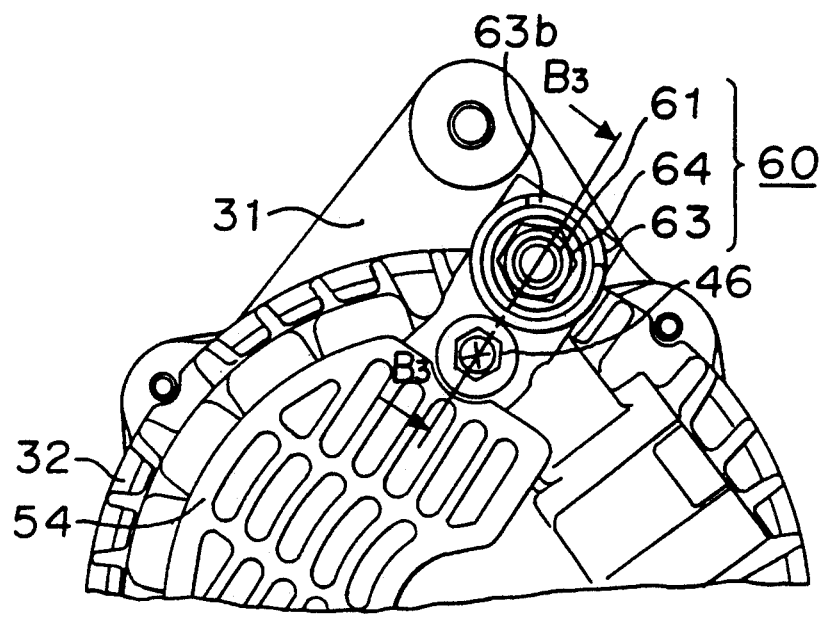
FIG. 3A is a side view partly broken of another embodiment of the output-terminal device according to the present invention, which is viewed from the back side of the generator.

FIG. 3A is a side view in partial section of another embodiment of the output-terminal device for an a.c. generator of the present invention, which is viewed from the rear side of the generator. Numeral 60 designates an output-terminal device provided at an outer edge of the rear bracket 32 so that an output-terminal bolt 61 extends to the rear direction.

Figure 3B:
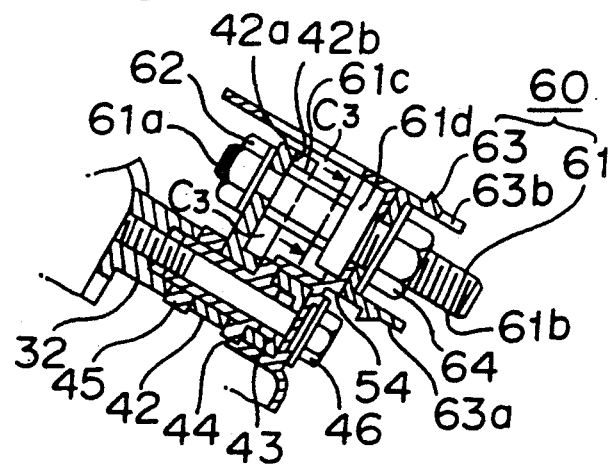
FIG. 3B is a cross-sectional view taken along a line B3—B3 in FIG. 3A.

FIG. 3B is a cross-sectional view showing the output-terminal device 60 connected to the output side of the rectifier device wherein numerals 32, 42–46, 52, 42a and 42b designate the same or corresponding parts as in FIG. 1B.

The output-terminal device 60 is constructed as follows. An output-terminal bolt 61 has a threaded portion 61a for attaching a terminal at its front end, a circular flange portion 61d at an intermediate portion, a square body portion 61c between the threaded portion 61a and the circular flange portion 61d and a second threaded portion 61b for fitting a terminal at the rear end. The output-terminal bolt 61 is fitted to the concave portion 42b of the connecting seat 42a of the heat sink 42 by fitting the square body portion 61c to the concave portion 42b. Further, a nut 62 is used to fasten the output-terminal bolt 61 to the connecting seat 42a. An insulation cover 54 is attached to the outer portion of the circular flange portion 61d and is fastened to a insulation terminal socket 63 by means of a nut 64. The insulation terminal socket 63 is made of a resinous material and has a bottomed cylindrical portion 63a wherein a circular opening is formed at the bottom portion. A cut portion 63c is formed at a part of the free end of the cylindrical portion 63a, and a crimp-style terminal 36 is inserted into the cut portion 63C to thereby prevent the terminal 36 from turning. The crimp-style terminal 36 is to connect an external wire 35.

Figure 3C:
FIG. 3C is a cross-sectional view taken along a line C3—C3 in FIG. 3B.
Figure 4A:
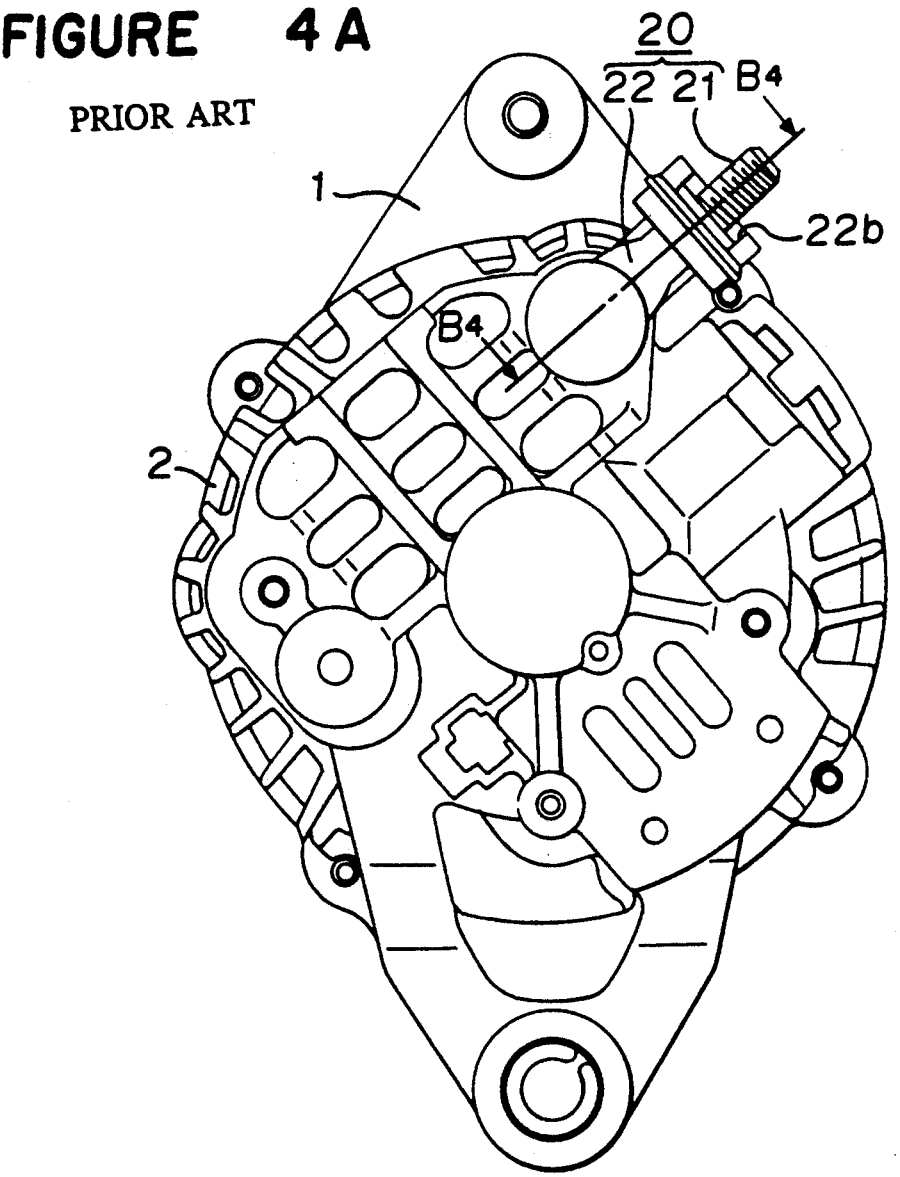
FIG. 4A is a side view showing a conventional output-terminal device for an a.c. generator for a vehicle, which is viewed from the rear side of the generator.
Figure 4B:
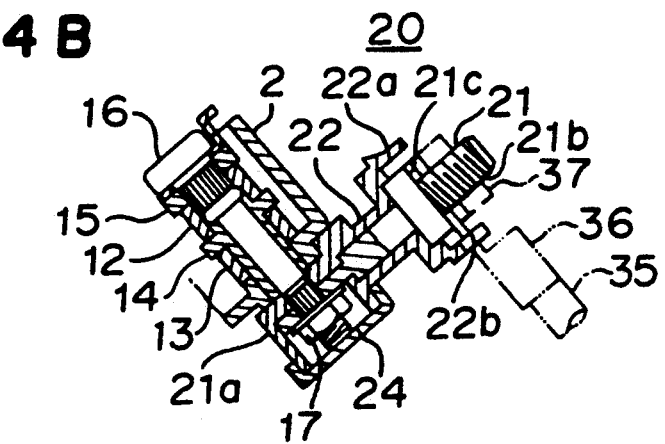
FIG. 4B is a cross-sectional view taken along a line B4—B4 in FIG. 4A.
Figure 5A:
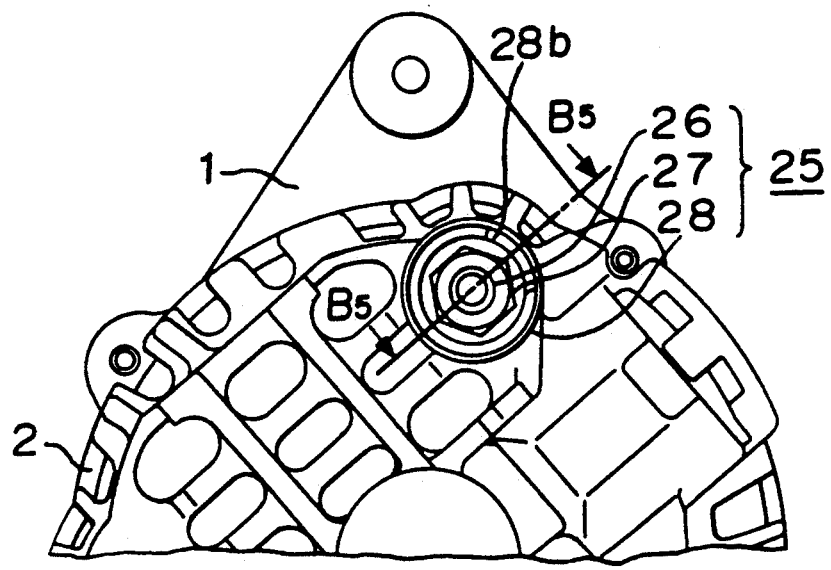
FIG. 5A is a side view partly broken of another conventional output-terminal device, which is viewed from the rear side of the generator.
Figure 5B:
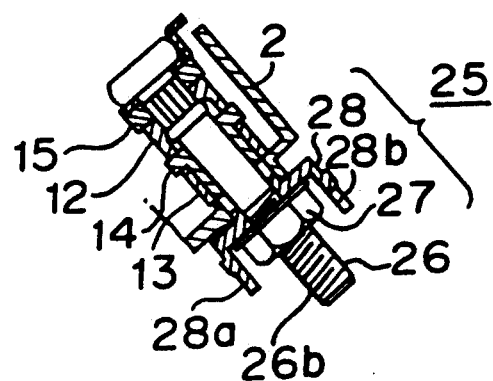
FIG. 5B is a cross-sectional view taken along a line B5—B5 in FIG. 5A.

FIG. 3C is a cross-sectional view showing the square body portion 61c.

In accordance with the present invention, an output-terminal bolt is attached to a connecting seat extended from the connecting portion of an output side heat sink of a rectifier device attached to the rear bracket of a generator. When the output-terminal bolt is to be extended to the lateral direction of the rear bracket, a flat portion is formed in the rear end of the output-terminal bolt and the flat portion is overlaid on the connecting seat of the heat sink so that the threaded portion formed at the front end of the output-terminal bolt is projected in the lateral side. On the other hand, when the output-terminal bolt is to be extended in the rear direction, an end of the output-terminal bolt is threaded and the threaded portion is inserted vertically into the through hole formed in the connecting seat of the heat sink so that the threaded portion for fitting a terminal of the output-terminal bolt formed at the front end is projected in the rear direction of the rear bracket. Accordingly, when the direction of extension of the output-terminal device is determined, only the output-terminal bolt and an insulation terminal socket which is used for preventing the terminal for an external wire attached to the threaded portion of the output-terminal bolt are changed even through the direction of extension of the terminal is changed. Further, it is unnecessary to change the rectifier device and only one kind of rectifier device is required, and therefore, standardization can be easy accomplished and productivity is improved.

What is claimed is:

1. An output terminal device for an a.c. generator of a vehicle wherein a rectifier for rectifying an a.c. voltage generated by the generator is attached to a rear bracket of the generator, comprising:
   a connecting portion extending from a perimeter of a heat sink of said rectifier in a direction which is substantially parallel to a plane defined by said heat sink, said connecting portion having a connecting seat defined thereon; and
   an output terminal bolt having a flat portion formed at a first end thereof and a threaded portion formed at a second end thereof, said flat portion lying substantially in a plane through which a longitudinal axis of said output-terminal bolt extends, said flat portion being connected to said connecting seat so that said longitudinal axis extends in a first direction which is parallel to said first plane.

2. An output-terminal device as claimed in claim 1, said output-terminal bolt having a polygonal flange portion formed at an intermediate portion thereof.

3. The output-terminal device for an a.c. generator for a vehicle according to claim 2, wherein said flat portion of said output-terminal bolt is fitted in a concave portion formed in said connecting seat so that said threaded portion and said polygonal flange portion of said output-terminal bolt extend in said first direction.

4. An output-terminal device for an a.c. generator of a vehicle wherein a rectifier for rectifying an a.c. voltage generated by the generator is attached to a rear bracket of the generator, comprising:
   a connecting portion extending from a heat sink of said rectifier, said connecting portion lying in substantially a first plane which is parallel to a plane defined by said heat sink and having a connecting seat defined thereon, said connecting seat having a hole formed therein, an axis of said hole extending in a first direction which is substantially perpendicular to said first plane; and
   an output-terminal bolt having a first threaded portion formed at a first end thereof and a second threaded portion formed at a second end thereof, said first threaded portion being inserted in said hole.

5. The output-terminal device for an a.c. generator for a vehicle according to claim 4, wherein said output-terminal bolt is fixed to said connecting seat by a nut which is threadably engaged with a portion of said first threaded portion so that said output-terminal bolt extends in said first direction.

6. An output terminal device as claimed in claim 4 wherein said connecting portion extends form a perimeter of said heat sink in a direction which is substantially parallel to a plane defined by said heat sink.

* * * * *